United States Patent
Ahmed et al.

(10) Patent No.: US 12,269,479 B2
(45) Date of Patent: Apr. 8, 2025

(54) DYNAMIC ASSIGNMENT OF FRICTION COEFFICIENT USING SENSOR DATA FOR USE IN SIMULATION

(71) Applicant: GM Cruise Holdings LLC, San Francisco, CA (US)

(72) Inventors: Rizwan Ahmed, Canton, MI (US); Nathan Beyers, Pittsburgh, PA (US)

(73) Assignee: GM Cruise Holdings LLC, San Francisco, CA (US)

( * ) Notice: Subject to any disclaimer, the term of this patent is extended or adjusted under 35 U.S.C. 154(b) by 223 days.

(21) Appl. No.: 17/989,929

(22) Filed: Nov. 18, 2022

(65) Prior Publication Data
US 2024/0166213 A1    May 23, 2024

(51) Int. Cl.
*B60W 40/06*    (2012.01)
*B60W 40/068*    (2012.01)
*G06V 20/56*    (2022.01)
*G06V 20/58*    (2022.01)

(52) U.S. Cl.
CPC ......... *B60W 40/068* (2013.01); *G06V 20/588* (2022.01); *B60W 2420/403* (2013.01); *B60W 2420/408* (2024.01); *B60W 2555/20* (2020.02)

(58) Field of Classification Search
CPC ......... B60W 40/068; B60W 2420/403; B60W 2420/408; B60W 2555/20; G06V 20/588; G06V 20/58
See application file for complete search history.

(56) References Cited

U.S. PATENT DOCUMENTS 10,780,861 B2 * 9/2020 Herman .................. G06T 7/246
11,940,793 B1 * 3/2024 Kavalar ................ B60W 60/00

* cited by examiner

*Primary Examiner* — Rodney A Butler (57) ABSTRACT

Systems and techniques are described for improving the accuracy of autonomous vehicle simulations by dynamically assigning friction coefficients to road features based on sensor data. A method of the disclosed technology can include steps for associating a predetermined friction coefficient to road features; receiving sensor data from a sensor on an autonomous vehicle; identifying, from the sensor data, the presence of a road feature; assigning in a simulation, a friction coefficient corresponding to the road feature based on the predetermined friction coefficient associated with road feature; and generating, based on the assigned friction coefficient, a simulation of a trip by the autonomous vehicle as the autonomous vehicle traverses the road feature.

17 Claims, 7 Drawing Sheets

| | ENVIRONMENTAL CONDITION | | | |
|---|---|---|---|---|
| ROAD FEATURE | DRY CONDITION | WET CONDITION | ICE CONDITION | SNOW CONDITION |
| ASPHALT | 0.67 | 0.53 | 0.15 | 0.10 |
| CONCRETE | 0.68 | 0.58 | 0.13 | 0.09 |
| GRAVEL | ... | ... | ... | ... |
| MANHOLE COVER | ... | ... | ... | ... |
| GRATE | ... | ... | ... | ... |
| LANE MARKING | ... | ... | ... | ... |
| LANE LETTERING | ... | ... | ... | ... |
| POTHOLE | ... | ... | ... | ... |

ASSOCIATING A PREDETERMINED FRICTION COEFFICIENT TO EACH ROAD FEATURE OF A PLURALITY OF ROAD FEATURES
602

RECEIVING SENSOR DATA FROM A SENSOR ON AN AUTONOMOUS VEHICLE
604

IDENTIFYING, FROM THE SENSOR DATA, THE PRESENCE OF THE AT LEAST ONE ROAD FEATURE IN A REAL-WORLD ENVIRONMENT
606

PERFORMING IMAGE PROCESSING TO DETERMINE A REFLECTIVITY OF THE AT LEAST ONE ROAD FEATURE
608

ASSIGNING IN A SIMULATION, A FRICTION COEFFICIENT CORRESPONDING TO THE AT LEAST ONE ROAD FEATURE BASED ON THE PREDETERMINED FRICTION COEFFICIENT ASSOCIATED WITH THE AT LEAST ONE ROAD FEATURE
610

GENERATING, BASED ON THE ASSIGNED FRICTION COEFFICIENT, A SIMULATION OF A TRIP BY THE AUTONOMOUS VEHICLE AS THE AUTONOMOUS VEHICLE TRAVERSES THE ROAD FEATURE
612

DYNAMIC ASSIGNMENT OF FRICTION COEFFICIENT USING SENSOR DATA FOR USE IN SIMULATION

TECHNICAL FIELD

The disclosed technology generally relates to improving the accuracy of an autonomous vehicle simulation. For example, aspects of the disclosure relate to systems and techniques for dynamically assigning friction coefficients using sensor data for use in simulation.

BACKGROUND

Autonomous vehicles are vehicles having computers and control systems that perform driving and navigation tasks that are conventionally performed by a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation, and to run simulations. The sensors can provide the data and measurements to an internal computing system of the autonomous vehicle, which can use the data and measurements to control a mechanical system of the autonomous vehicle, such as a vehicle propulsion system, a braking system, or a steering system.

BRIEF DESCRIPTION OF THE DRAWINGS

Certain features of the subject technology are set forth in the appended claims. However, the accompanying drawings, which are included to provide further understanding, illustrate disclosed aspects and together with the description explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring certain concepts.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

An autonomous vehicle (AV) is a motorized vehicle that can navigate without a human driver. An exemplary AV can include various sensors, such as a camera sensor, a light detection and ranging (LIDAR) sensor, a radio detection and ranging (RADAR) sensor, an inertial measurement unit (IMU), and/or an acoustic sensor (e.g., sound navigation and ranging (SONAR), microphone, etc.), global navigation satellite system (GNSS) and/or global positioning system (GPS) receiver, amongst others. The AV can use these various sensors to collect data and measurements that the AV can use for AV operations such as perception (e.g., object detection, event detection, tracking, localization, sensor fusion, point cloud processing, image processing, etc.), planning (e.g., route planning, trajectory planning, situation analysis, behavioral and/or action planning, mission planning, etc.), control (e.g., steering, braking, throttling, lateral control, longitudinal control, model predictive control (MPC), proportional-derivative-integral, etc.), prediction (e.g., motion prediction, behavior prediction, etc.), etc. The sensors can provide the data and measurements to an internal computing system of the autonomous vehicle, which can use the data and measurements to run one or more simulations and/or control a mechanical system of the autonomous vehicle, such as a vehicle propulsion system, a braking system, and/or a steering system, for example.

Simulations may also be used, for example, to test one or more changes/updates of the code of an AV software, test how an AV implementing the AV software performs in a test scenario (e.g., an environment, a testing condition(s), etc.) reproduced in the simulation, test and validate the AV software (and/or a change(s) to the code of the AV software) before the AV software is transferred to an AV (e.g., before the AV software is released to an AV and used by the AV in real-world scenarios), and/or test one or more aspects of the AV software such as, for example, one or more capabilities, operations, and/or behaviors performed and/or controlled/influenced by the AV software, etc. In some examples, the simulation can be used to test one or more AV software stacks (and/or code and/or aspects thereof) such as, for example and without limitation, a perception stack, a planning stack, a prediction stack, a control stack, a localization stack, and/or any other AV software stack(s).

Simulations, however, may reveal divergences between AV behavior in the real-world and the behavior of the simulated AV in the simulation. Such divergences may be caused by one or more variables in the test scenario that may not accurately reflect the real-world environment. For example, a simulation may model sudden braking of the AV. One parameter that may be included in such modeling is the friction coefficient of a road surface. Conventional simulators may utilize a static friction coefficient for a particular road surface, such as asphalt. The use of a static friction coefficient in a simulation, however, does not account for changes in environmental conditions due to weather such as rain or ice, and further does not account for artifacts that may be on a road surface that could affect an interaction between an AV tire and the road, such as drains, manholes, or lane demarcations.

Described herein are systems, apparatuses, processes (also referred to as methods), and computer-readable media (collectively referred to as "systems and techniques") for improving the accuracy of simulations by utilizing data collected from one or more sensors of one or more AVs, while the one or more AVs drive and navigate real-world environments, to inform model parameters relating to friction coefficients. As will be discussed in further detail below, AV sensors may provide data to identify road features and environmental conditions experienced by an AV, to dynamically assign a friction coefficient to road features traversed by the AV. By dynamically assigning friction coefficients to road features, an accuracy of the simulation is improved.

Figure 1:
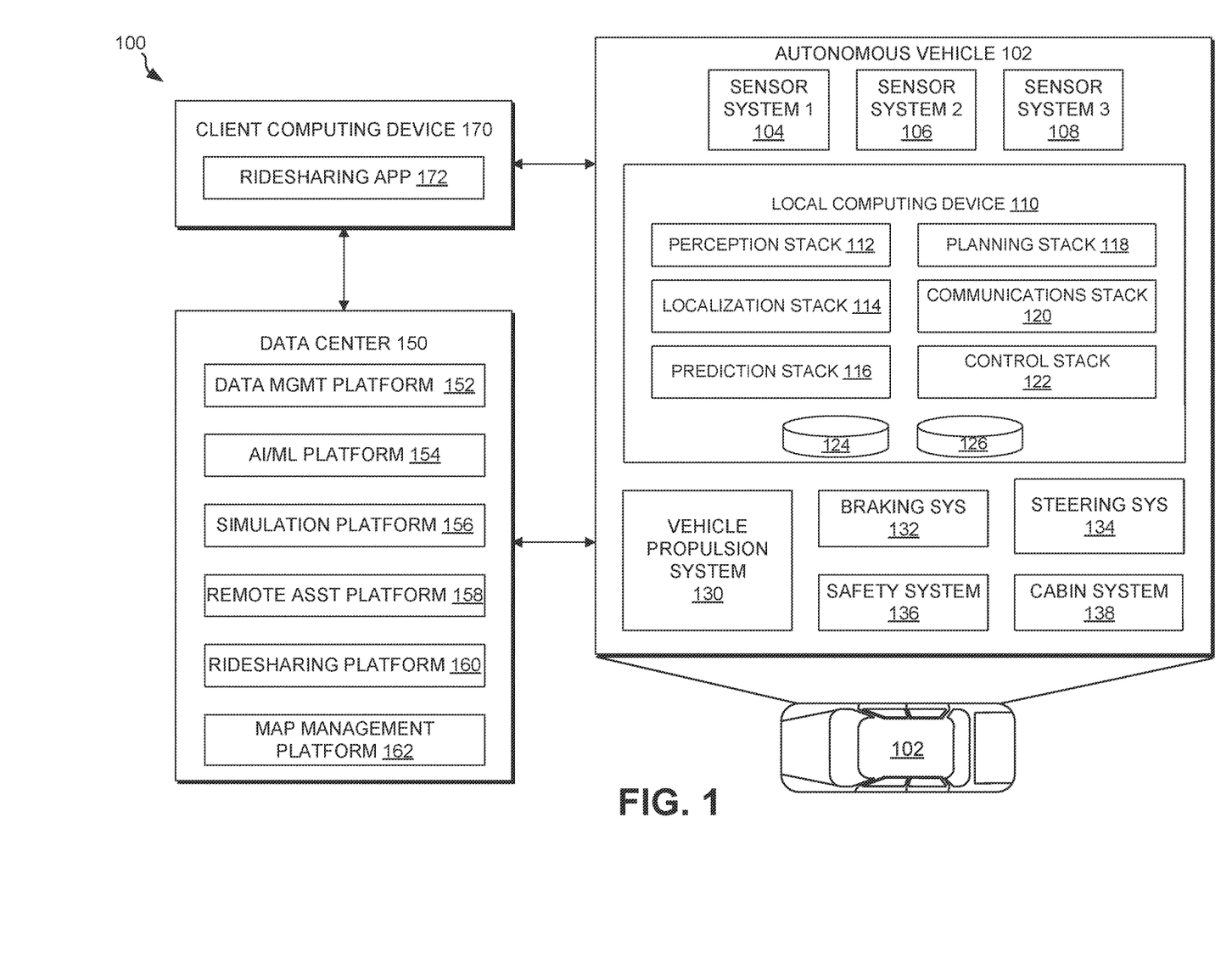
FIG. 1 illustrates an example system environment that can be used to facilitate autonomous vehicle navigation and routing operations, according to some aspects of the disclosed technology.

FIG. 1 illustrates an example system environment 100 for operating an AV in communication with a remote data center, according to some aspects of the disclosed technology. One of ordinary skill in the art will understand that, for the system environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the system environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), optical sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can include a camera system, the sensor system 106 can include a LIDAR system, and the sensor system 108 can include a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, accelerometers, cameras, microphones, LIDAR, RADAR, ultrasonic sensors, the HD geospatial database 126, etc.). For example, in some embodiments, AV 102 can compare sensor data captured in real-time by sensor systems 104-108 to data in HD geospatial database 126 to determine its precise (e.g., accurate to the order of a few centimeters or less) position and orientation. AV 102 can focus its search based on sensor data from one or more first sensor systems (e.g., GPS) by matching sensor data from one or more second sensor systems (e.g., LIDAR). If the mapping and localization information from one system is unavailable, AV 102 can use mapping and localization information from a redundant system and/or from remote data sources.

The prediction stack 116 can receive information from localization stack 114 and objects identified by perception stack 112 and predict a future path for the objects. In some embodiments, prediction stack 116 can output several likely paths that an object is predicted to take along with a probability associated with each path. For each predicted path, prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate AV 102 safely and efficiently in its environment. For example, planning stack 118 can receive the location, speed, and direction of AV 102, geospatial data, data regarding objects sharing the road with AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. Planning stack 118 can determine multiple sets of one or more mechanical operations that AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can include multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. In some cases, the client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of data center 150. For example, the AI/ML platform 154 may incorporate the map viewing services for visualizing the effectiveness of various object detection or object classification models, simulation platform 156 may incorporate the map viewing services for recreating and visualizing certain driving scenarios, remote assistance platform 158 may incorporate the map viewing services for replaying traffic incidents to facilitate and coordinate aid, ridesharing platform 160 may incorporate the map viewing services into client application 172 to enable passengers to view AV 102 in transit en route to a pick-up or drop-off location, and so on.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can, in some instances, include one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
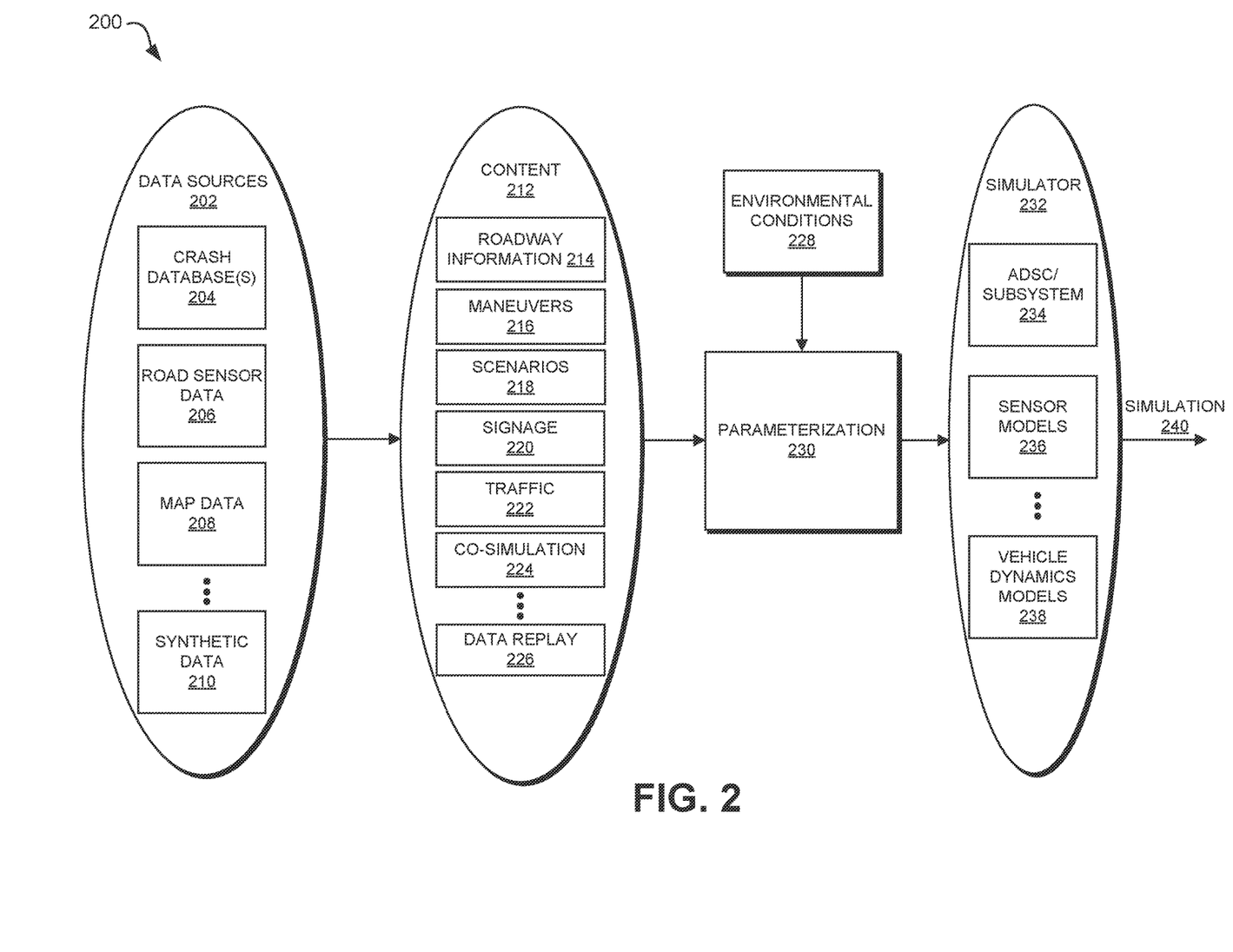
FIG. 2 illustrates an example simulation framework, according to some aspects of the disclosed technology.

FIG. 2 illustrates an example simulation framework 200, according to some aspects of the disclosed technology. The example simulation framework 200 can include data sources 202, content 212, environmental conditions 228, parameterization 230, and simulator 232. The components in the example simulation framework 200 are merely illustrative examples provided for explanation purposes. In other examples, the simulation framework 200 can include other components that are not shown in FIG. 2 and/or more or less components than shown in FIG. 2.

The data sources 202 can be used to create a simulation. The data sources 202 can include, for example and without limitation, one or more crash databases 204, road sensor data 206, map data 208, and/or synthetic data 210. In other examples, the data sources 202 can include more or less sources than shown in FIG. 2 and/or one or more data sources that are not shown in FIG. 2.

The crash databases 204 can include crash data (e.g., data describing crashes and/or associated details) generated by vehicles involved in crashes. The road sensor data 206 can include data collected by one or more sensors (e.g., one or more camera sensors, LIDAR sensors, RADAR sensors, SONAR sensors, IMU sensors, GPS/GNSS receivers, and/or any other sensors) of one or more vehicles while the one or more vehicles drive/navigate one or more real-world environments. The map data 208 can include one or more maps (and, in some cases, associated data) such as, for example and without limitation, one or more high-definition (HD) maps, sensor maps, scene maps, and/or any other maps. In some examples, the one or more HD maps can include roadway information such as, for example, lane widths, location of road signs and traffic lights, directions of travel for each lane, road junction information, speed limit information, etc.

The synthetic data 210 can include virtual assets, objects, and/or elements created for a simulated scene, a virtual scene and/or virtual scene elements, and/or any other synthetic data elements. For example, in some cases, the synthetic data 210 can include one or more virtual vehicles, virtual pedestrians, virtual roads, virtual objects, virtual environments/scenes, virtual signs, virtual backgrounds, virtual buildings, virtual trees, virtual motorcycles/bicycles, virtual obstacles, virtual environmental elements (e.g., weather, lightening, shadows, etc.), virtual surfaces, etc.

In some examples, data from some or all of the data sources 202 can be used to create the content 212. The content 212 can include static content and/or dynamic content. For example, the content 212 can include roadway information 214, maneuvers 216, scenarios 218, signage 220, traffic 222, co-simulation 224, and/or data replay 226. The roadway information 214 can include, for example, lane information (e.g., number of lanes, lane widths, directions of travel for each lane, etc.), the location and information of road signs and/or traffic lights, road junction information, speed limit information, road attributes (e.g., surfaces, angles of inclination, curvatures, obstacles, etc.), road topologies, and/or other roadway information. The maneuvers 216 can include any AV maneuvers, and the scenarios 218 can include specific AV behaviors in certain AV scenes/environments. The signage 220 can include signs such as, for example, traffic lights, road signs, billboards, displayed messages on the road, etc. The traffic 222 can include any traffic information such as, for example, traffic density, traffic fluctuations, traffic patterns, traffic activity, delays, positions of traffic, velocities, volumes of vehicles in traffic, geometries or footprints of vehicles, pedestrians, spaces (occupied and/or unoccupied), etc.

The co-simulation 224 can include a distributed modeling and simulation of different AV subsystems that form the larger AV system. In some cases, the co-simulation 224 can include information for connecting separate simulations together with interactive communications. In some cases, the co-simulation 224 can allow for modeling to be done at a subsystem level while providing interfaces to connect the subsystems to the rest of the system (e.g., the autonomous driving system computer (ADSC)). Moreover, the data replay 226 can include replay content produced from real-world sensor data (e.g., road sensor data 206).

The environmental conditions 228 can include any information about environmental conditions 228. For example, the environmental conditions 228 can include atmospheric conditions, road/terrain conditions (e.g., surface slope or gradient, surface geometry, surface coefficient of friction, road obstacles, etc.), illumination, weather, road and/or scene conditions resulting from one or more environmental conditions, etc.

The content 212 and the environmental conditions 228 can be used to create the parameterization 230. The parameterization 230 can include parameter ranges, parameterized scenarios, probability density functions of one or more parameters, sampled parameter values, parameter spaces to be tested, evaluation windows for evaluating a behavior of an AV in a simulation, scene parameters, content parameters, environmental parameters, etc. The parameterization 230 may include friction coefficients for road surfaces or road features that may be dynamically assigned, as discussed further below. The parameterization 230 can be used by a simulator 232 to generate a simulation 240.

The simulator 232 can include a software engine(s), algorithm(s), neural network model(s), and/or software component(s) used to generate simulations, such as simulation 240. In some examples, the simulator 232 can include ADSC/subsystem models 234, sensor models 236, and a vehicle dynamics model 238. The ADSC/subsystem models 234 can include models, descriptors, and/or interfaces for the autonomous driving system computer (ADSC) and/or ADSC subsystems such as, for example, a perception stack (e.g., perception stack 112), a localization stack (e.g., localization stack 114), a prediction stack (e.g., prediction stack 116), a planning stack (e.g., planning stack 118), a communications stack (e.g., communications stack 120), a control stack (e.g., control stack 122), a sensor system(s), and/or any other subsystems.

The sensor models 236 can include mathematical representations of hardware sensors and an operation (e.g., sensor data processing) of one or more sensors (e.g., a LIDAR, a RADAR, a SONAR, a camera sensor, an IMU, and/or any other sensor). The vehicle dynamics model 238 can model vehicle behaviors/operations, vehicle attributes, vehicle trajectories, vehicle positions, etc.

Figure 3:
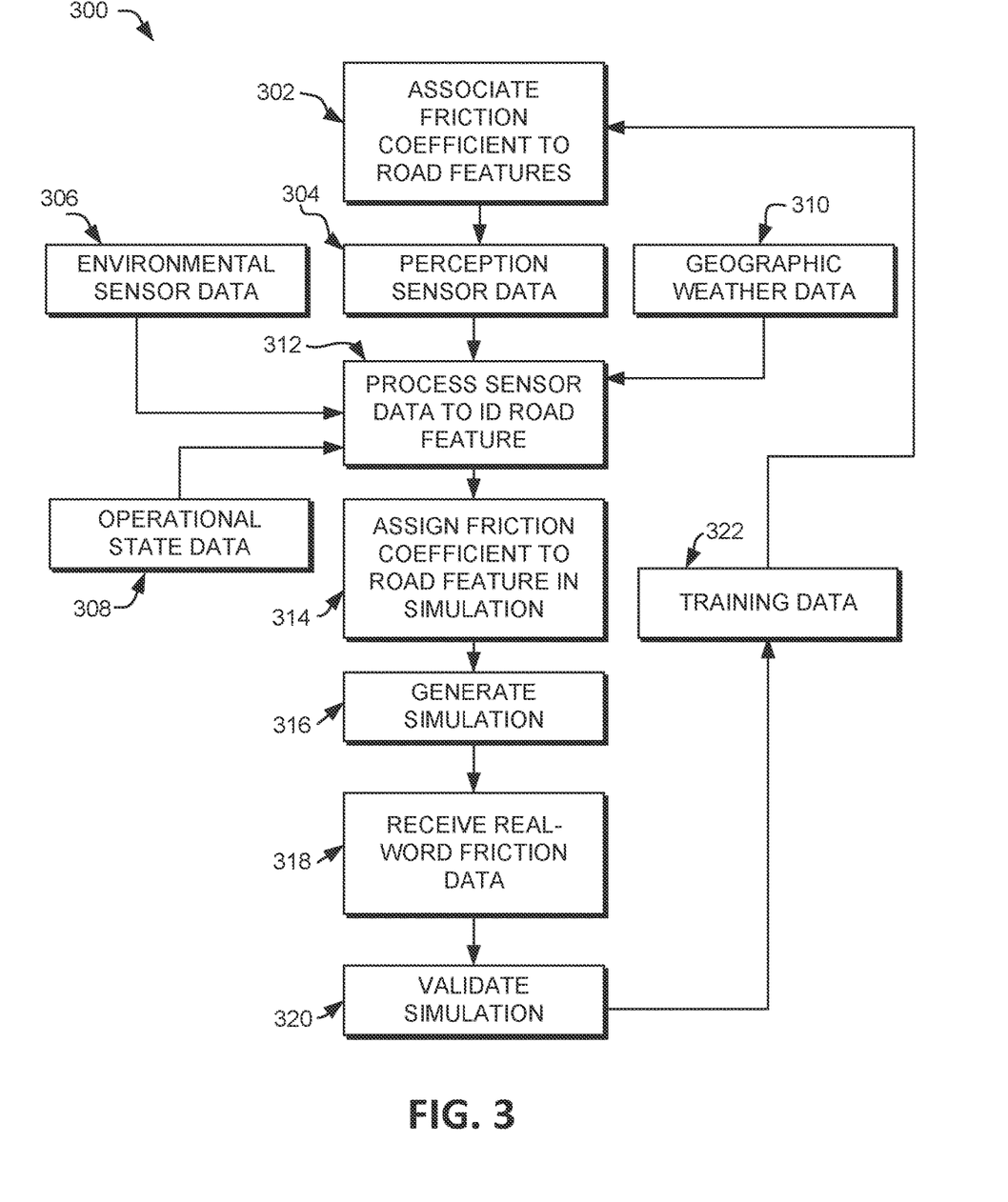
FIG. 3 illustrates an example process for dynamically assigning a friction coefficient to a road feature for use in a simulation, according to some aspects of the disclosed technology.
Figure 4:
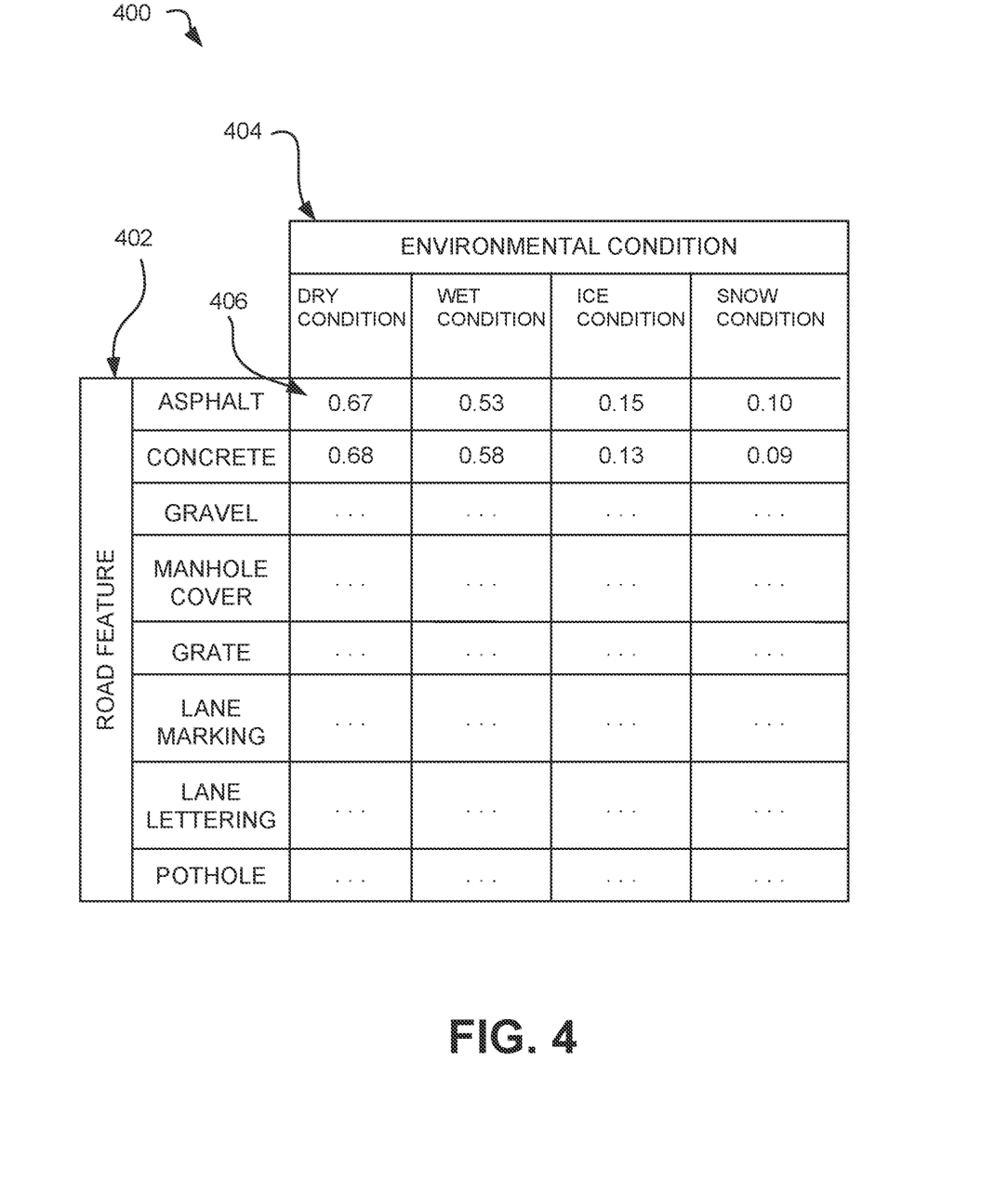
FIG. 4 illustrates an example table of friction coefficients associated to road features according to varying environmental conditions, according to some aspects of the disclosed technology.

FIG. 3 illustrates an example process 300 for dynamically assigning a friction coefficient to a road feature for use in a simulation, according to some aspects of the disclosed technology. The process begins at block 302 where a pre-determined friction coefficient is associated to a variety of road features. For example, a friction coefficient may be assigned to individual road features, where each road feature represents a type of surface or object an AV may traverse with a tire. The association of friction coefficients to road features may be recorded or otherwise documented in a database or table, as shown in FIG. 4. The association of friction coefficients to road features may also include friction coefficients that account for varying environmental conditions, such as rain, ice, or snow. Road features may include road surface material (e.g., asphalt, concrete, gravel, sand, rock, etc.), pavement markers (e.g., lane demarcations, painted signs, etc.), and road artifacts (e.g., manhole cover, grate, patch, pothole, etc.).

At block 304, perception sensor data is received from one or more sensors on an AV. The sensors provide perception data that is amenable to image processing, and may include a camera, LIDAR, RADAR, or other sensor that is capable of providing image data. At block 306, environmental sensor data is received from one or more sensors on an AV. Such sensors may include a rain sensor, temperature sensor, humidity sensor, or other sensor that is capable of providing environmental data. At block 308, operational state data is received from one or more components on the AV. Such components may include a windshield wiper, climate control blower, or other components that are indicative of an environmental condition. Operational state data may include data indicating whether a component is powered or activated (e.g., air conditioner, windshield wiper, heater, etc.), degree of activation (e.g., fast wiper, intermittent wiper, etc.), and/or setting (e.g., interior temperature setting, etc.). At block 310, geographical weather data is received from a remote source. Geographical weather data may include regional forecasts, precipitation data, or other data relating to weather in a particular geographical area.

At block 312, received sensor data is processed to identify the presence of road features in the real-world environment, to identify the type of road feature present in the real-world environment, and to identify an environmental condition of the real-world environment. Specifically, perception sensor data is processed to identify one or more road features in a real-world environment. For example, camera footage may be processed to identify a roadway, lane demarcations, manhole cover, drain grate, and/or pothole. In one aspect, image processing to identify road features may be performed by one or more of the following machine learning classification models, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

In addition, perception sensor data may be further processed to identify the environmental condition of the real-world environment. For example, for perception sensor data provided by LIDAR, the data may be processed to determine a reflectivity of the identified road feature. Reflectivity for a particular road feature, such as a manhole cover, varies based on the environmental condition in which the manhole cover is placed. A wet manhole cover returns a reflectivity signature that is different than a dry manhole cover. Similarly, wet asphalt returns a reflectivity signature that is different than dry asphalt. By analyzing the reflectivity in returns from such materials, an environmental condition may be identified. As with image processing, machine learning classification models may also be utilized to identify reflectivity signatures for road features.

In another aspect, environmental sensor data may also be processed to identify or confirm an environmental condition. For example, temperature data from a temperature sensor may inform an environmental condition where perception data indicates wet conditions. Specifically, if temperature data indicates temperatures below 32° C., conditions are likely to involve ice and thus a road feature should be assigned a friction coefficient that is associated with icy conditions, rather than wet conditions. As another example, data from a rain sensor may be used to confirm wet environmental conditions.

In yet another aspect, operational state data may be processed to identify or confirm an environmental condition. For example, an operational state of windshield wipers may be used to indicate environmental conditions as being wet due to rain, and thus would result in a reduced friction coefficient for applicable road features. Geographical weather data may also be processed to identify or confirm an environmental condition.

At block 314, a friction coefficient is assigned to the identified road feature according to the identified environmental condition. The assigned coefficient of friction is identified from the friction coefficients provided at block 302. The assigned friction coefficient may then be used in a simulation of the AV traversing the road feature to more accurately model a response.

At block 316, the simulation is generated as described above with reference to FIG. 2. The simulation is indicative of an interaction between the AV and the road feature, with the simulation accounting for real-world driving conditions via use of a dynamic friction coefficient that reflects the type of road feature traversed by the AV, as well as the environmental condition of the road feature.

At block 318, real-world friction data may be received from a friction sensor. As discussed below with reference to FIG. 5, the AV may utilize a friction sensor 500 to measure a friction force by solving for the friction coefficient where the weight of the friction sensor 500 is known.

At block 320, the assigned friction coefficient used in the simulation is validated by using the friction coefficient derived from the friction sensor 500. At block 322, the calculated coefficient of friction may be used to train machine learning models or update the friction coefficient values provided at block 302 to better reflect real-world values.

FIG. 4 illustrates an example table 400 of friction coefficients associated to road features according to varying environmental conditions, according to some aspects of the disclosed technology. Table 400 provides values for friction coefficients 406 for different road features 402 based on different environmental conditions 404. As shown, road features 402 may include road materials (e.g., asphalt, concrete, or gravel), road artifacts (e.g., manhole covers, grates), and pavement markers (e.g., lane markings, lane lettering). Road features are items that may be identified using perception sensors (e.g., camera, LIDAR) that are traversed by tires of the AV.

Environmental conditions 404 include different driving conditions that may affect friction coefficients of road features. Exemplary environmental conditions 404 include dry, wet, ice, and snow. As shown, a coefficient of friction 406 for a particular road feature is highest in the dry condition, and decreases in wet, ice and snow conditions. The table 400 may be configured to support lookup functions or other similar database functions to enable retrieval of a corresponding friction coefficient 406 for a particular road feature 402 in a particular environmental condition. The retrieved friction coefficient can then be assigned to the appropriate road feature in a simulation as described herein to improve the accuracy and fidelity of the simulation.

Figure 5:
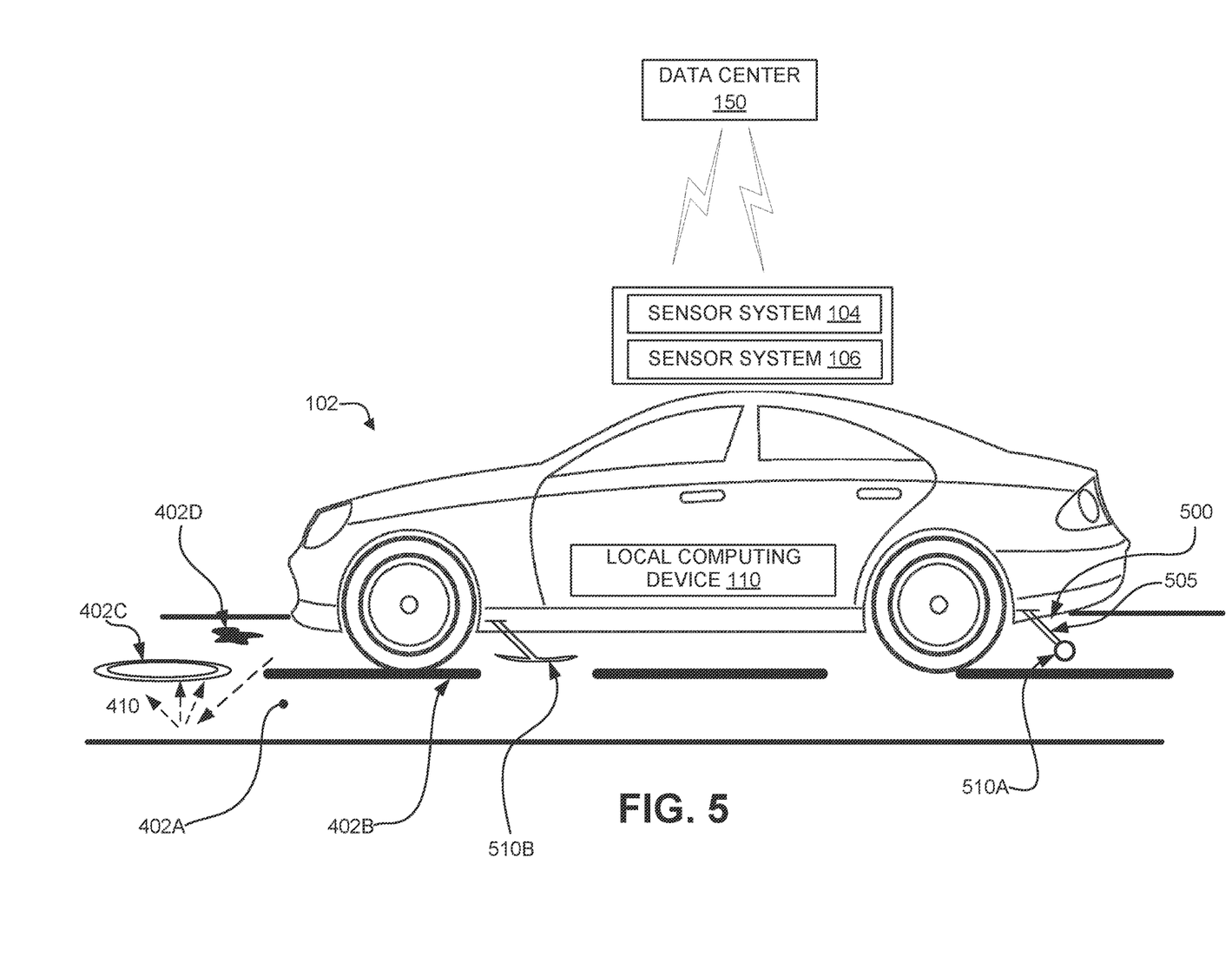
FIG. 5 illustrates a schematic of an example autonomous vehicle in a real-world environment utilizing friction sensors, according to some aspects of the disclosed technology.

FIG. 5 illustrates a schematic of an example AV 102 in a real-world environment utilizing friction sensors 500, according to some aspects of the disclosed technology. Road data relating to road features in a real-world environment are collected from sensor systems 104, 106. Sensor system 104 can include a camera system and sensor system 106 can include a LIDAR system. Sensor data is provided to the local computing device 110 via communications stack 120.

In some aspects, data from sensors 104, 106 may be sent to data center 150 via communications stack 120 for processing in data management platform 152. Sensor data may be utilized by AI/ML platform 154 to identify sensor data signatures that identify particular road features and/or environmental conditions. Sensor data may thus be used by AI/ML platform 154 to train and evaluate machine learning algorithms for identifying road features and the environmental condition of the road feature.

As discussed above, reflectivity signatures in return signals 410 may be processed to identify signatures indicative of dry conditions, wet conditions, ice conditions, or snow conditions. In general, moisture results in greater scatter of return signals 410, thereby signifying that a particular road feature is not dry and thus may have a reduced friction coefficient.

Using the AI/ML platform 154, data scientists can prepare data sets from sensors 104, 106; select, design, and train machine learning models; evaluate, refine, and deploy the models; maintain, monitor, and retrain the models; and so on in order to identify threshold measurements and/or measurement signatures indicative of certain environmental conditions. In addition, the AI/ML platform 154 may generate algorithms that are trained from a collection of historical sensor data received from various AVs that represent measurements associated with various road features in various environmental conditions. The historical sensor data may be labeled with classifications based on a type of road feature and environmental condition.

In operation, sensors 104, 106 provide sensor data relating to road features 402A-D and processed to identify the presence of particular road features, such as road material 402A, lane demarcations 402B, manhole cover 402C, and pothole 402D. Each road feature has a different friction coefficient due to material properties of each road feature. In addition, each road feature has a different friction coefficient depending on the environment. Return signals 410 may be processed to identify weather conditions as discussed above.

In addition, other sensor data or operational state data may be used to identify or confirm environmental conditions. For example, environmental sensor data from a rain sensor, temperature sensor, or humidity sensor mounted on the AV may be used to identify the environmental conditions. Similarly, an operational state of a component on the AV, such as a windshield wiper, blower motor, or other similar component, may be used to identify the environmental condition.

Sensor data is thus processed to identify road features and the environmental condition. Based on the identified road features and environmental condition, friction coefficients are dynamically assigned to the corresponding road features for use in a simulation.

The AV 102 may also utilize a friction sensor 500 to calculate the real-world coefficient of friction for known road features to improve simulator accuracy. In one example, the friction sensor 500 may include an arm 505 that is coupled to a wheel 510A at one end, and coupled to a chassis of the AV 102 at an opposite end. The arm 505 is equipped with a sensor that is configured to measure a force for pulling the wheel. When the weight of the wheel is known, the friction coefficient can be calculated by dividing the pulling force by the weight of the wheel. Alternatively, the friction sensor 500 may utilize a sled 510B that is configured to slide over the road features. Similarly, the arm 505 is configured to measure a pulling force of the sled and when the weight of the sled is known, the friction coefficient for a particular road feature can be calculated. When calculated, the real-world friction coefficient can be used to validate the friction coefficient used in the simulation, and as discussed above with reference to FIG. 3, may be revised to better improve the accuracy of the simulation. In some cases, the friction sensor 500 can additionally or alternatively be used in real-time by the AV 102 (e.g., as the AV 102 navigates a scene). By continuously monitoring the friction coefficient, the friction sensor 500 can detect a loss or sudden loss of friction (e.g., such as a loss of friction caused by an icy road or any other road condition that can affect the friction associated with the road) and inform, instruct, and/or request an AV stack of the AV 102 (e.g., an AV stack used by the AV 102 to control an operation/behavior of the AV 102) to adjust an operation and/or behavior of the AV 102. For example, by continuously monitoring the friction coefficient, the friction sensor 500 can detect a loss or sudden loss of friction and inform an AV stack of the AV 102 to operate the AV 102 at a slower speed and/or perform more conservative AV maneuvers (e.g., AV maneuvers having a higher/better safety metric, AV maneuvers having a lower estimated risk of resulting in a safety event such as a collision, AV maneuvers associated with a higher response and/or reaction time, AV maneuvers performed at a lower speed, etc.) than the AV maneuver(s) that the AV 102 may otherwise perform (and/or would likely perform) if the friction sensor 500 (or any other sensor) did not detect a loss or sudden loss of friction. Moreover, the data from the friction sensor 500 can be modeled in simulation to verify such behavior.

In some examples, the implementation of the friction sensor 500 that includes the arm 505 coupled to a wheel 510A and the implementation of the friction sensor 500 that utilizes the sled 510B can measure slightly different things. For example, the implementation of the friction sensor 500 that utilizes the sled 510B may continuously slide while the AV 102 is in motion, and can allow the friction sensor 500 to measure the dynamic friction coefficient. On the other hand, the implementation of the friction sensor 500 that includes the arm 505 coupled to a wheel 510A may need controllable braking, but can measure the force at which it starts to slip so the friction sensor 500 can compute static friction coefficients, dynamic friction coefficients, or both static and dynamic friction coefficients.

Figure 6:
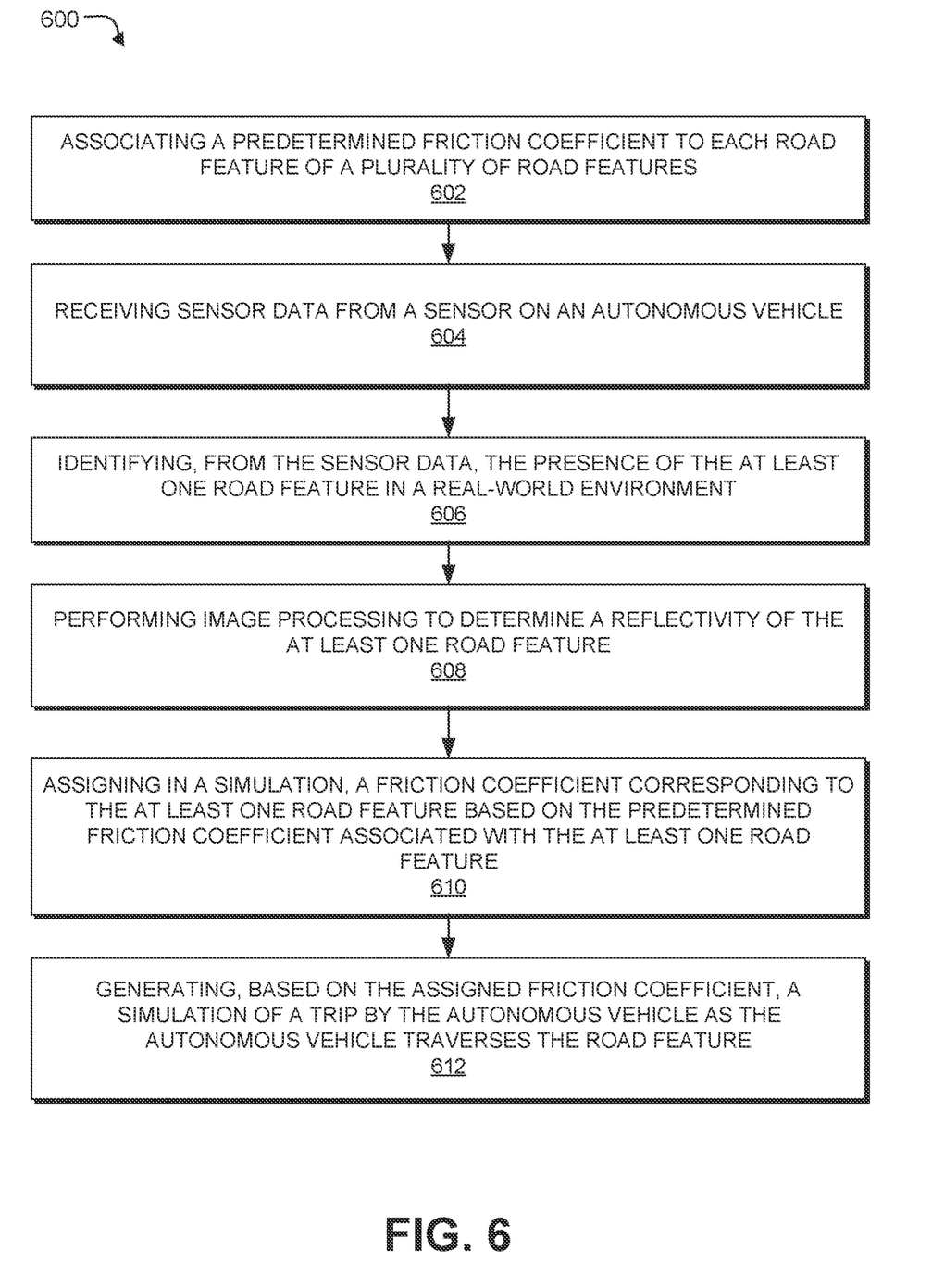
FIG. 6 illustrates an example method for dynamically assigning friction coefficients to road features for use in a simulation, according to some aspects of the disclosed technology.

FIG. 6 illustrates an example method 600 for dynamically assigning friction coefficients to road features for use in a simulation, according to some aspects of the disclosed technology. The method 600 begins with step 602, in which a predetermined friction coefficient is associated to each road feature of a plurality of road features. The predetermined friction coefficients are associated based on the type of road feature (e.g., road material, road artifact, pavement markers, etc.) as well as an environmental condition (e.g., dry condition, wet condition, ice condition, snow condition, etc.). The predetermined friction coefficients may be associated to each road feature via use of a lookup table.

At step 604, sensor data is received from a sensor on an autonomous vehicle. The sensor data is related to at least one road feature of the plurality of road features. The sensor may include a camera and/or LIDAR. Other sensor data may also be received, such as environmental sensor data relating to the environment in which the AV is operating. Such environmental sensor data may be received from a rain sensor, temperature sensor, or humidity sensor mounted on the AV. Other data that may be received may include operational state data of components on the AV that may be indicative of the environmental condition. Such components may include a windshield wiper, or climate control blower. An indication that a windshield wiper is activated, for example, may indicate that the road features are wet and thus have a reduced friction coefficient.

At step 606, the presence of a road feature in a real-world environment is identified from the sensor data. In some aspects, machine learning may be applied to the sensor data to identify the road feature, as discussed above. At step 608, image processing may be further performed on the sensor data to determine a reflectivity of the road feature. By ascertaining a reflectivity signature for a particular road feature, an environmental condition of the at least one road feature may be identified as discussed above. In some aspects, environmental conditions may be identified and/or confirmed using the environmental sensor data and/or the operational state data, as discussed above. In other aspects, geographical weather data may also be used to confirm environmental conditions as also discussed above.

At step 610, a friction coefficient corresponding to the identified real-world road feature and environmental condition is assigned in a simulation. In one example, a lookup function may be used to identify the friction coefficient that should be used in the simulation for a particular road feature.

At step 612, a simulation is generated based on the assigned friction coefficient. The simulation is of a trip by the AV as the AV traverses the road feature and is indicative of an interaction between one or more tires of the AV and the road feature. By utilizing a friction coefficient that is assigned based on sensor data, the simulation accounts for driving conditions in the real-world environment.

The method 600 may further include receiving force data from a friction sensor on the AV and validating the assigned friction coefficient used in the simulation by using the force data from the friction sensor, where the force data is further processed to determine the real-world friction coefficient for the road feature.

The method 600 improves the accuracy and fidelity of AV software simulation by accounting for varying materials and environmental conditions of a road traversed by the AV. By utilizing sensor data provided by the AV, road features can be identified and environmental conditions acknowledged so that friction coefficients are dynamically assigned to road features traversed by the AV.

Figure 7:
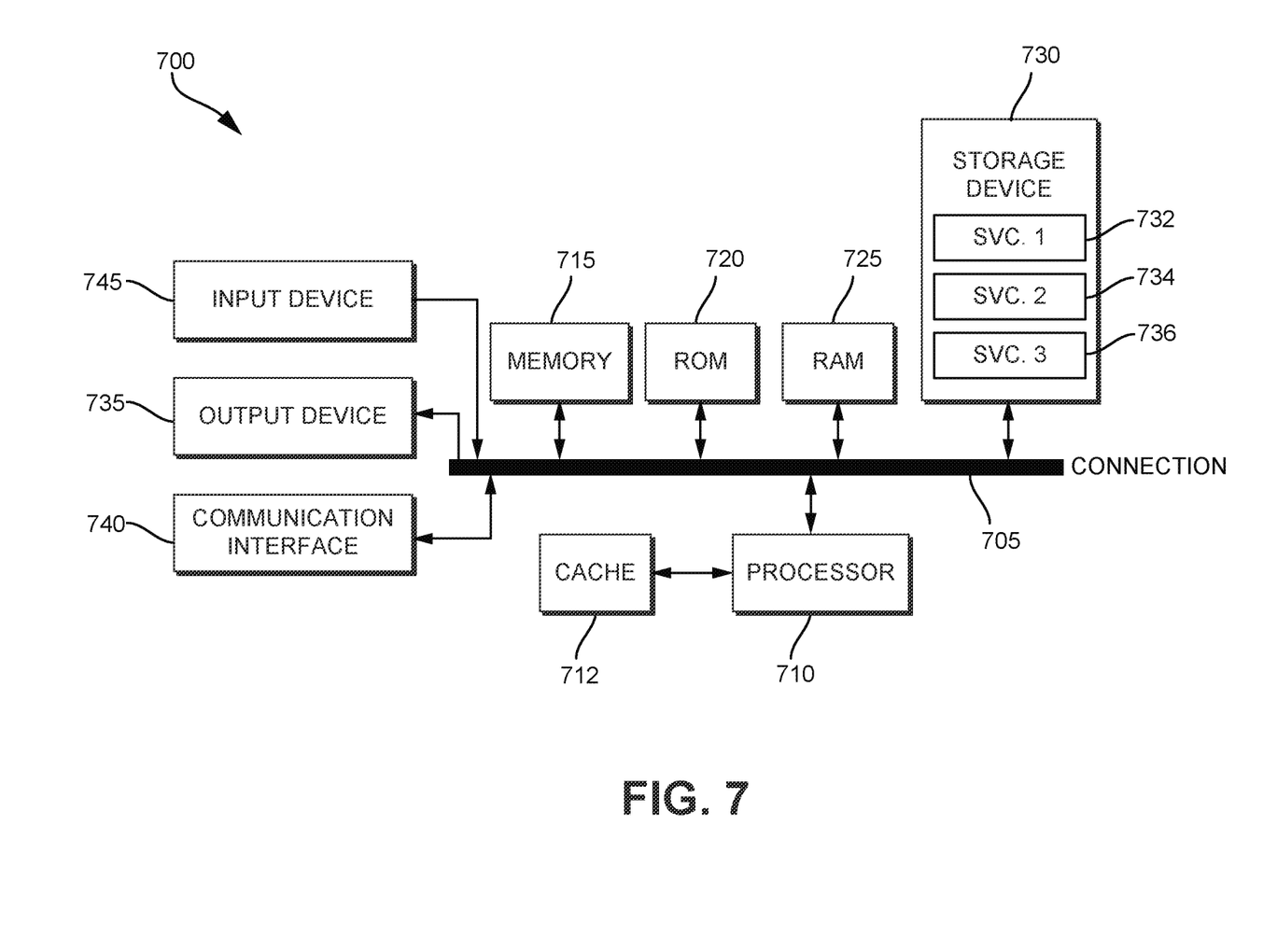
FIG. 7 illustrates an example processor-based system architecture for implementing certain aspects described herein.

FIG. 7 illustrates an example processor-based system architecture for implementing certain aspects described herein. For example, processor-based system 700 can be any computing device making up internal computing system 110, remote computing system 150, a passenger device executing the rideshare app 170, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

Computing system 700 can be (or may include) a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L6), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A computer-implemented method comprising: associating a predetermined friction coefficient to each road feature of a plurality of road features; receiving sensor data from a sensor on an autonomous vehicle, wherein the sensor data is related to at least one road feature of the plurality of road features; identifying, from the sensor data, a presence of the at least one road feature in a real-world environment; assigning in a simulation, a friction coefficient corresponding to the at least one road feature based on the predetermined friction coefficient associated with the at least one road feature; and generating, based on the assigned friction coefficient, a simulation of a trip by the autonomous vehicle as the autonomous vehicle traverses the at least one road feature, the simulation indicative of an interaction between the autonomous vehicle and the at least one road feature, wherein the simulation accounts for driving conditions in the real-world environment based on use of the assigned friction coefficient for the at least one road feature.

Aspect 2. The computer-implemented method of Aspect 1, wherein the sensor comprises at least one of a camera sensor and a light detection and ranging (LIDAR) sensor.

Aspect 3. The computer-implemented method of any of Aspects 1 or 2, wherein the plurality of road features includes at least one of road surface material, pavement markers, and road artifacts.

Aspect 4. The computer-implemented method of any of Aspects 1 to 3, further comprising applying a machine learning model to the sensor data to identify the at least one road feature.

Aspect 5. The computer-implemented method of Aspect 4, further comprising performing image processing to determine a reflectivity of the at least one road feature, the reflectivity indicative of an environmental condition of the at least one road feature.

Aspect 6. The computer-implemented method of any of Aspects 1 to 5, further comprising receiving environmental sensor data from a second sensor on an autonomous vehicle, wherein the second sensor comprises at least one of a rain sensor, temperature sensor, and humidity sensor.

Aspect 7. The computer-implemented method of Aspect 6, further comprising: receiving an operational state of a component on the autonomous vehicle, the component comprising at least one of a windshield wiper and climate control blower; and identifying, from the environmental sensor data and the operational state of the component, an environmental condition of the at least one road feature, wherein the environmental condition includes at least one of a wet condition, ice condition, and snow condition.

Aspect 8. The computer-implemented method of Aspect 7, further comprising: receiving geographical weather data; and confirming, from the geographical weather data, the environmental condition of the at least one road feature.

Aspect 9. The computer-implemented method of any of Aspects 1 to 8, further comprising: receiving force data from a friction sensor on the autonomous vehicle; and validating the assigned friction coefficient used in the simulation by using the force data from the friction sensor, wherein the force data is further processed to determine the real-world friction coefficient for the at least one road feature.

Aspect 10. A non-transitory computer-readable storage medium comprising at least one instruction for causing one or more processors to: associate a predetermined friction coefficient to each road feature of a plurality of road features based on an environmental condition for each road feature; receive sensor data from at least one of a sensor mounted on an autonomous vehicle, wherein the sensor data is related to at least one road feature of the plurality of road features; identify, from the sensor data, the presence and environmental condition of the at least one road feature in a real-world environment; assign in a simulation, a friction coefficient corresponding to the at least one road feature based on the predetermined friction coefficient associated with the environmental condition of the at least one road feature; and generate, based on the assigned friction coefficient, a simulation of a trip by the autonomous vehicle as the autonomous vehicle traverses the at least one road feature, the simulation indicative of an interaction between the autonomous vehicle and the at least one road feature, wherein the simulation accounts for driving conditions in the real-world environment based on use of the assigned friction coefficient for the at least one road feature.

Aspect 11. The non-transitory computer-readable storage medium of Aspect 10, wherein the plurality of road features includes at least one of road surface material, pavement markers, and road artifacts.

Aspect 12. The non-transitory computer-readable storage medium of any of Aspects 10 or 11, wherein the instructions are further configured to cause the one or more processors to apply a machine learning model to the sensor data to identify the at least one road feature.

Aspect 13. The non-transitory computer-readable storage medium of Aspect 12, wherein the instructions are further configured to cause the one or more processors to perform image processing to determine a reflectivity of the at least one road feature, the reflectivity indicative of the environmental condition of the at least one road feature.

Aspect 14. The non-transitory computer-readable storage medium of any of Aspects 10 to 13, wherein the instructions are further configured to cause the one or more processors to: receive environmental sensor data from a second sensor on an autonomous vehicle, wherein the second sensor comprises at least one of a rain sensor, temperature sensor, and humidity sensor.

Aspect 15. The non-transitory computer-readable storage medium of Aspect 14, wherein the instructions are further configured to cause the one or more processors to: receive an operational state of a component on the autonomous vehicle, the component comprising at least one of a windshield wiper and climate control blower; and identify, from the environmental sensor data and the operational state of the component, the environmental condition of the at least one road feature, wherein the environmental condition includes at least one of a wet condition, ice condition, and snow condition.

Aspect 16. The non-transitory computer-readable storage medium of Aspect 15, wherein the instructions are further configured to cause the one or more processors to: receive geographical weather data; and confirm, from the geographical weather data, the environmental condition of the at least one road feature.

Aspect 17. A system comprising: at least one processor; and at least one memory having stored thereon computer-readable instructions that, when executed by the at least one processor, causes the at least one processor to: associate a predetermined friction coefficient to each road feature of a plurality of road features based on an environmental condition for each road feature; receive sensor data from at least one of a sensor mounted on an autonomous vehicle, wherein the sensor data is related to at least one road feature of the plurality of road features; identify, from the sensor data, the presence and environmental condition of the at least one road feature in a real-world environment; assign in a simulation, a friction coefficient corresponding to the at least one road feature based on the predetermined friction coefficient associated with the environmental condition of the at least one road feature; and generate, based on the assigned friction coefficient, a simulation of a trip by the autonomous vehicle as the autonomous vehicle traverses the road feature, the simulation indicative of an interaction between the autonomous vehicle and the at least one road feature, wherein the simulation accounts for driving conditions in the real-world environment based on use of the assigned friction coefficient for the at least one road feature.

Aspect 18. The system of Aspect 17, wherein the plurality of road features includes at least one of road surface material, pavement markers, and road artifacts.

Aspect 19. The system of any of Aspects 17 or 18, wherein the instructions are further configured to cause the at least one processor to: apply a machine learning model to the sensor data to identify the at least one road feature; and perform image processing to determine a reflectivity of the at least one road feature, the reflectivity indicative of the environmental condition of the at least one road feature.

Aspect 20. The system of any of Aspects 17 to 19, wherein the instructions are further configured to cause the at least one processor to: receive environmental sensor data from a second sensor on an autonomous vehicle, wherein the second sensor comprises at least one of a rain sensor, temperature sensor, and humidity sensor; receive an operational state of a component on the autonomous vehicle, the component comprising at least one of a windshield wiper and climate control blower; and identify, from the environmental sensor data and the operational state of the component, the environmental condition of the at least one road feature, wherein the environmental condition includes at least one of a wet condition, ice condition, and snow condition.

Aspect 21. The system of Aspect 20, wherein the instructions are further configured to cause the at least one processor to: receive geographical weather data; and confirm, from the geographical weather data, the environmental condition of the at least one road feature.

Aspect 22. The system of any of Aspects 17 to 21, wherein the system comprises at least one of the autonomous vehicle and a computer of the autonomous vehicle.

Aspect 23. A system comprising means for performing a method according to any of Aspects 1 to 9.

Aspect 24. A non-transitory computer-readable medium having stored thereon instructions which, when executed by one or more processors, cause the one or more processors to perform a method according to any of Aspects 1 to 9.

Aspect 25. A computer-program product comprising instructions which, when executed by one or more processors, cause the one or more processors to perform a method according to any of Aspects 1 to 9.

Aspect 26. An autonomous vehicle comprising a computer device configured to perform a method according to any of Aspects 1 to 9.

What is claimed is:

1. A computer-implemented method comprising:
    associating a predetermined friction coefficient to each road feature of a plurality of road features;
    receiving sensor data from a sensor on an autonomous vehicle, wherein the sensor data is related to at least one road feature of the plurality of road features;
    identifying, from the sensor data, a presence of the at least one road feature in a real-world environment;
    assigning in a simulation, a friction coefficient corresponding to the at least one road feature based on the predetermined friction coefficient associated with the at least one road feature;
    generating, based on the assigned friction coefficient, a simulation of a trip by the autonomous vehicle as the autonomous vehicle traverses the at least one road feature, the simulation indicative of an interaction between the autonomous vehicle and the at least one road feature, wherein the simulation accounts for driving conditions in the real-world environment based on use of the assigned friction coefficient for the at least one road feature;
    receiving force data from a friction sensor on the autonomous vehicle; and
    validating the assigned friction coefficient used in the simulation by using the force data from the friction sensor, wherein the force data is further processed to determine the real-world friction coefficient for the at least one road feature.

2. The computer-implemented method of claim 1, wherein the sensor comprises at least one of a camera sensor and a light detection and ranging (LIDAR) sensor.

3. The computer-implemented method of claim 1, wherein the plurality of road features includes at least one of road surface material, pavement markers, and road artifacts.

4. The computer-implemented method of claim 1, further comprising applying a machine learning model to the sensor data to identify the at least one road feature.

5. The computer-implemented method of claim 4, further comprising performing image processing to determine a reflectivity of the at least one road feature, the reflectivity indicative of an environmental condition of the at least one road feature.

6. The computer-implemented method of claim 1, further comprising receiving environmental sensor data from a second sensor on an autonomous vehicle, wherein the second sensor comprises at least one of a rain sensor, temperature sensor, and humidity sensor.

7. The computer-implemented method of claim 6, further comprising:
    receiving an operational state of a component on the autonomous vehicle, the component comprising at least one of a windshield wiper and climate control blower; and
    identifying, from the environmental sensor data and the operational state of the component, an environmental condition of the at least one road feature, wherein the environmental condition includes at least one of a wet condition, ice condition, and snow condition.

8. The computer-implemented method of claim 7, further comprising:
receiving geographical weather data; and
confirming, from the geographical weather data, the environmental condition of the at least one road feature.

9. A non-transitory computer-readable storage medium comprising at least one instruction for causing one or more processors to:
associate a predetermined friction coefficient to each road feature of a plurality of road features based on an environmental condition for each road feature;
receive sensor data from at least one of a sensor mounted on an autonomous vehicle, wherein the sensor data is related to at least one road feature of the plurality of road features;
identify, from the sensor data, the presence and environmental condition of the at least one road feature in a real-world environment;
assign in a simulation, a friction coefficient corresponding to the at least one road feature based on the predetermined friction coefficient associated with the environmental condition of the at least one road feature;
generate, based on the assigned friction coefficient, a simulation of a trip by the autonomous vehicle as the autonomous vehicle traverses the at least one road feature, the simulation indicative of an interaction between the autonomous vehicle and the at least one road feature, wherein the simulation accounts for driving conditions in the real-world environment based on use of the assigned friction coefficient for the at least one road feature;
receive environmental sensor data from a second sensor on an autonomous vehicle, wherein the second sensor comprises at least one of a rain sensor, temperature sensor, and humidity sensor;
receive an operational state of a component on the autonomous vehicle, the component comprising at least one of a windshield wiper and climate control blower; and
identify, from the environmental sensor data and the operational state of the component, the environmental condition of the at least one road feature, wherein the environmental condition includes at least one of a wet condition, ice condition, and snow condition.

10. The non-transitory computer-readable storage medium of claim 9, wherein the plurality of road features includes at least one of road surface material, pavement markers, and road artifacts.

11. The non-transitory computer-readable storage medium of claim 9, wherein the instructions are further configured to cause the one or more processors to apply a machine learning model to the sensor data to identify the at least one road feature.

12. The non-transitory computer-readable storage medium of claim 11, wherein the instructions are further configured to cause the one or more processors to perform image processing to determine a reflectivity of the at least one road feature, the reflectivity indicative of the environmental condition of the at least one road feature.

13. The non-transitory computer-readable storage medium of claim 9, wherein the instructions are further configured to cause the one or more processors to:
receive geographical weather data; and
confirm, from the geographical weather data, the environmental condition of the at least one road feature.

14. A system comprising:
at least one processor;
at least one memory storing computer-readable instructions that, when executed by the at least one processor, causes the at least one processor to:
associate a predetermined friction coefficient to each road feature of a plurality of road features based on an environmental condition for each road feature;
receive sensor data from at least one of a sensor mounted on an autonomous vehicle, wherein the sensor data is related to at least one road feature of the plurality of road features;
identify, from the sensor data, the presence and environmental condition of the at least one road feature in a real-world environment;
assign in a simulation, a friction coefficient corresponding to the at least one road feature based on the predetermined friction coefficient associated with the environmental condition of the at least one road feature;
generate, based on the assigned friction coefficient, a simulation of a trip by the autonomous vehicle as the autonomous vehicle traverses the road feature, the simulation indicative of an interaction between the autonomous vehicle and the at least one road feature, wherein the simulation accounts for driving conditions in the real-world environment based on use of the assigned friction coefficient for the at least one road feature;
receive environmental sensor data from a second sensor on an autonomous vehicle, wherein the second sensor comprises at least one of a rain sensor, temperature sensor, and humidity sensor;
receive an operational state of a component on the autonomous vehicle, the component comprising at least one of a windshield wiper and climate control blower; and
identify, from the environmental sensor data and the operational state of the component, the environmental condition of the at least one road feature, wherein the environmental condition includes at least one of a wet condition, ice condition, and snow condition.

15. The system of claim 14, wherein the plurality of road features includes at least one of road surface material, pavement markers, and road artifacts.

16. The system of claim 14, wherein the instructions are further configured to cause the at least one processor to:
apply a machine learning model to the sensor data to identify the at least one road feature; and
perform image processing to determine a reflectivity of the at least one road feature, the reflectivity indicative of the environmental condition of the at least one road feature.

17. The system of claim 14, wherein the instructions are further configured to cause the at least one processor to:
receive geographical weather data; and
confirm, from the geographical weather data, the environmental condition of the at least one road feature.

* * * * *